(No Model.)
J. MAGNUSEN.
SIDEWALK LIGHT CONSTRUCTION.
No. 600,880. Patented Mar. 22, 1898.
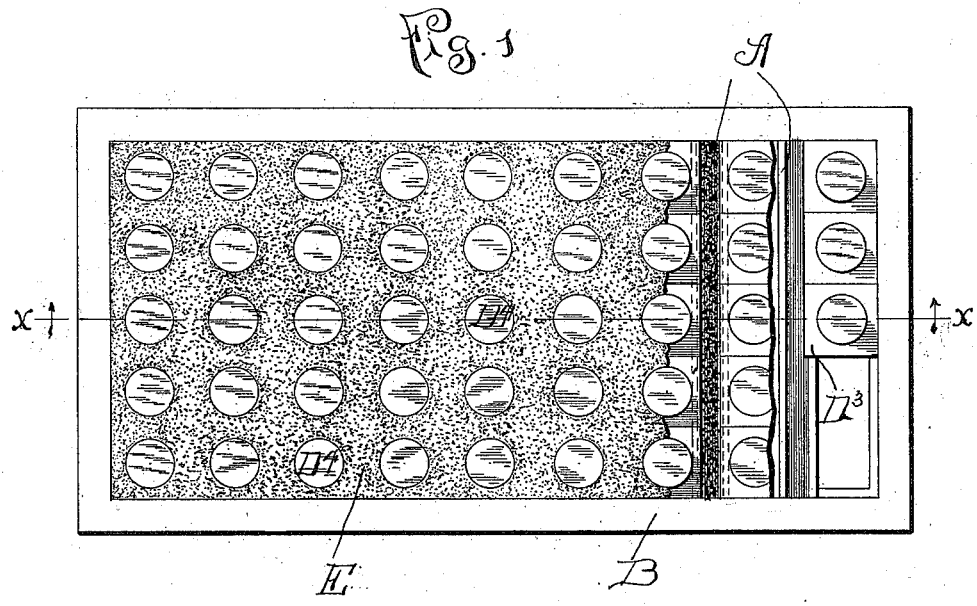
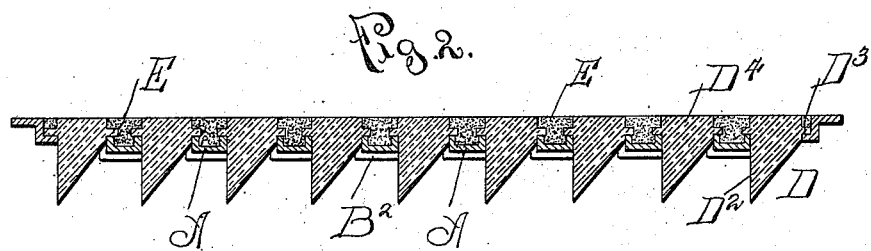
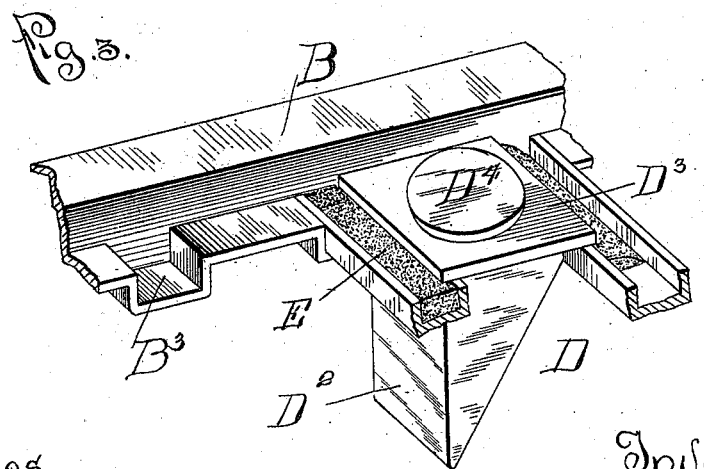
Witnesses
J. B. Weir
R. A. White.
Inventor
James Magnusen,
By Chas. C. Buckley,
Atty.

UNITED STATES PATENT OFFICE.

JAMES MAGNUSEN, OF CHICAGO, ILLINOIS.

SIDEWALK-LIGHT CONSTRUCTION.

SPECIFICATION forming part of Letters Patent No. 600,880, dated March 22, 1898.

Application filed May 10, 1897. Serial No. 635,800. (No model.)

*To all whom it may concern:*

Be it known that I, JAMES MAGNUSEN, a citizen of the United States, residing at Chicago, in the county of Cook and State of Illinois, have invented certain new and useful Improvements in Sidewalk-Light Construction, of which the following is a specification.

My invention relates to certain improvements in the means whereby sidewalk lights or lenses are supported and permanently held in position, this result being accomplished by frame construction or sections within which the illuminating lenses or lights are placed.

My invention is more particularly designed to materially cheapen the cost of construction and to give it greater strength and durability, at the same time more firmly and securely hold the lenses or lights in position, and also to prevent the formation of leaking joints.

My invention has certain other objects in view; and it consists in certain features about to be described, reference being now had to the accompanying drawings, in which—

Figure 1 is a plan view of a section of sidewalk-light construction, the cement filling or covering being partly broken away. Fig. 2 is a longitudinal section on the line $x\ x$ of Fig. 1. Fig. 3 is a perspective of a portion of the construction.

In carrying out my invention I provide supporting bars or frames cupped, grooved, or channeled upon the upper side, upon which the flanges or projecting bases of the lenses rest in such manner that while they partly overlap the channels they do not meet the flanges or bases projecting from the lenses on the opposite side of said bars. Thus when cement is applied it penetrates past the edges of said flanges and fills the channels, and being finally leveled up to the top of the lenses and hardening it locks both above and beneath said flanges or bases, making a permanently-rigid structure and obviating all danger of leaking joints.

The simplest and most convenient form now known to me in which to carry out said invention consists in the provision of parallel supporting-bars A, which are, as shown, of channel-iron, with the cupped, grooved, or channeled face on the upper side. These supporting-bars are held in approximately parallel position by the border-frame B, which is angular, providing a seating-ledge $B^2$ for said bars, having at intervals the receiving-sockets $B^3$ for the bars. The lenses D for use with said parallel bars consist of a drop extension $D^2$, a projecting rectangular base or flange portion $D^3$, and an exposed tread extension $D^4$, and they may be arranged in position by inserting the drop extension of each lens between the parallel supporting channel-bars, so that the flanges or bases of the lenses rest upon said bars and project slightly over the channel therein, but not so as to meet the contiguous flanges or bases of the lenses on the opposite sides of said bars, leaving a cleft or opening which gives access to the channel and to the under side of the flanges, so that cement may pass through and fill in the channel beneath said flanges. When thus adjusted in position in this particular instance, the base of each lens in a given series—that is, of the series of lenses included between any two of the parallel supporting-bars—abuts against the base of its neighbor in said series, thus forming a continuous glass base without any interposed cross supporting-bars, permitting the more thorough passage and diffusion of light. When the lenses have been thus arranged and a sufficient number placed in position, the cement filling E is spread over the bases of the lenses and over the supporting-bars, the plastic stuff entering through the spaces left between the flanges above the channels and filling said channels beneath the flanges and the interstices between said flanges and the treads thereabove, so that when it sets the bases or flanges will be inclosed on both sides by a rigid and homogeneous layer of cement. It will be observed that by this means in the specific construction described a continuous surface of cement and glass is provided and the bases of the lenses arranged in line and abutting against each other in series to permit the free passage of light. It will also be obvious that since the bases of the lenses rest upon the channeled supports A in such manner that a passage is afforded for the cement the body of cement filling in homogeneously on both sides of the bases will strengthen the construction, bind the lenses securely in position, and prevent the formation of leaking joints.

It will be understood that I do not desire to limit myself particularly to what are technically known as "channel-bars," or bars of the construction shown, since it is evident that any form of bars having recesses therein to permit the filling in of a body of cement beneath the bases or supporting-flanges of the lenses in the manner described will be within the principle of my invention.

I claim—

1. In a sidewalk-light construction the combination of cupped, grooved, or channeled supporting-bars, lenses having flanges or projecting bases arranged upon said bars with their flanges partially covering said grooves or channels and cement homogeneously filling said grooves or channels, beneath the flanges, and the interstices between the flanges above said channels and between the treads of the lenses.

2. In a sidewalk-light construction, the combination with lenses having rectangular bases, and upward extensions therefrom, of parallel supporting-bars disposed below the surface, said bars having longitudinal channels or recesses therein, the bases of the lenses resting on the parallel supporting-bars and projecting partly over the channels therein without meeting, and a homogeneous cement filling the channels or recesses of the bars below the bases of the lenses and about and above said bases flush with the top portion of the upward extension from said bases, whereby a strong construction is provided incapable of leakage.

3. In a sidewalk-light construction, the combination with lenses having rectangular bases and upward extensions therefrom, of parallel supporting-bars disposed below the surface, said bars having longitudinal channels or recesses therein, the bases of each individual series of lenses between the supporting-bars abutting against each other and resting upon said bars and projecting over the channels therein without abutting against the bases of the next adjacent series, and a homogeneous cement filling the channels or recesses of the bars below the bases of the lenses and about and above said bases flush with the top portion of the upward extension from said bases, whereby a strong construction is provided incapable of leakage.

In testimony whereof I affix my signature in presence of two witnesses.

JAMES MAGNUSEN.

Witnesses:
L. M. BULKLEY,
C. C. BULKLEY.